US012779262B2

(12) United States Patent
Yu et al.

(10) Patent No.: US 12,779,262 B2
(45) Date of Patent: Nov. 3, 2026

(54) FLAME ARRESTER CAPABLE OF AUTOMATICALLY ELIMINATING DEFECTS OF FIRE ARRESTING PORTION

(71) Applicants: CHINA PETROLEUM & CHEMICAL CORPORATION, Beijing (CN); SINOPEC Research Institute of Safety Engineering Co., Ltd., Qingdao (CN)

(72) Inventors: Anfeng Yu, Qingdao (CN); Peng Wang, Qingdao (CN); Lei Bao, Qingdao (CN); Zhe Yang, Qingdao (CN); Xiaodong Ling, Qingdao (CN); Jinling Liu, Qingdao (CN); Yazhen Wang, Qingdao (CN); Yuntao Mu, Qingdao (CN); Yihao Wang, Qingdao (CN); Xue Jiang, Qingdao (CN)

(73) Assignees: CHINA PETROLEUM & CHEMICAL CORPORATION, Beijing (CN); SINOPEC RESEARCH INSTITUTE OF SAFETY ENGINEERING CO., LTD., Shandong (CN)

( * ) Notice: Subject to any disclaimer, the term of this patent is extended or adjusted under 35 U.S.C. 154(b) by 435 days.

(21) Appl. No.: 18/694,256

(22) PCT Filed: May 19, 2022

(86) PCT No.: PCT/CN2022/093804

§ 371 (c)(1),
(2) Date: Mar. 21, 2024

(87) PCT Pub. No.: WO2023/045362

PCT Pub. Date: Mar. 30, 2023

(65) Prior Publication Data

US 2024/0390714 A1 Nov. 28, 2024

(30) Foreign Application Priority Data

Sep. 24, 2021 (CN) ........................ 202111121576.X
Sep. 24, 2021 (CN) ........................ 202111121577.4
(Continued)

(51) Int. Cl.
*A62C 4/00* (2006.01)

(52) U.S. Cl.
CPC .................................... *A62C 4/00* (2013.01)

(58) Field of Classification Search
CPC ................................................ F16L 55/02745
See application file for complete search history.

(56) References Cited

U.S. PATENT DOCUMENTS 1,681,698 A * 8/1928 Brooks .................. F23D 14/82 48/192
2,277,294 A * 3/1942 Brooks .................... A62C 4/00 48/192
(Continued)

FOREIGN PATENT DOCUMENTS

CA 2067612 C 1/1995
CN 1530164 A 9/2004
(Continued)

OTHER PUBLICATIONS

International Search Report (PCT/ISA/210) with English translation, and Written Opinion (PCT/ISA/237) mailed on Jul. 6, 2022, by the China National Intellectual Property Administration as the International Searching Authority for International Application No. PCT/CN2022/093804. (12 pages).
(Continued)

*Primary Examiner* — David R Deal
(74) *Attorney, Agent, or Firm* — Panitch Schwarze Belisario & Nadel LLP

(57) ABSTRACT

A flame arrester capable of automatically eliminating defects of a fire arresting portion. The flame arrester includes a fire
(Continued)

arresting section, wherein the fire arresting section is provided with a fire arresting section housing, the fire arresting section housing is hollow and fire arresting section openings are respectively formed at two ends of the fire arresting section housing, blocking portions are respectively arranged at the fire arresting section openings so as to define a fire arresting cavity between the two blocking portions, a plurality of openings are formed in the blocking portion, the fire arresting cavity is filled with fire arresting particles, the fire arresting section further includes a fire arresting particle replenishment structure, and the fire arresting particle replenishment structure is configured to automatically fill the fire arresting cavity with the fire arresting particles when a gap is generated in the fire arresting cavity.

20 Claims, 10 Drawing Sheets

(30) Foreign Application Priority Data

Sep. 24, 2021 (CN) .......................... 202111123395.0
Sep. 24, 2021 (CN) .......................... 202111123543.9

(56) References Cited

U.S. PATENT DOCUMENTS

| | | | | | |
|---|---|---|---|---|---|
| 3,079,242 | A * | 2/1963 | Glasgow | F23D 14/82 48/192 |
| 3,173,411 | A * | 3/1965 | Corbin | A62C 4/02 431/346 |
| 3,748,111 | A * | 7/1973 | Klose | F16L 55/00 220/88.2 |
| 3,918,889 | A * | 11/1975 | Green | F23D 14/72 431/346 |
| 4,015,954 | A * | 4/1977 | Reed | A62C 4/02 55/DIG. 20 |
| 5,145,360 | A | 9/1992 | Rajewski | |
| 5,211,554 | A * | 5/1993 | Rajewski | A62C 4/02 220/88.2 |
| 6,699,035 | B2 * | 3/2004 | Brooker | A62C 4/02 222/189.01 |
| 9,205,292 | B2 * | 12/2015 | Riordan | A62C 4/00 |
| 10,661,108 | B2 * | 5/2020 | Hong | A62C 4/04 |
| 2003/0044740 | A1 | 3/2003 | Brooker | |
| 2010/0218958 | A1 | 9/2010 | Cooling et al. | |
| 2015/0089907 | A1 | 4/2015 | Reid et al. | |
| 2018/0296866 | A1 | 10/2018 | Riordan | |
| 2020/0179735 | A1 | 6/2020 | Arnhold et al. | |
| 2025/0207773 | A1 | 6/2025 | Ono et al. | |

FOREIGN PATENT DOCUMENTS

| | | | |
|---|---|---|---|
| CN | 201249909 | Y | 6/2009 |
| CN | 101994548 | A | 3/2011 |
| CN | 201874645 | U | 6/2011 |
| CN | 102688574 | A | 9/2012 |
| CN | 102940943 | A | 2/2013 |
| CN | 204522070 | U | 8/2015 |
| CN | 105521574 | A | 4/2016 |
| CN | 107185135 | A | 9/2017 |
| CN | 206675856 | U | 11/2017 |
| CN | 207055756 | U | 3/2018 |
| CN | 108379760 | A | 8/2018 |
| CN | 209766202 | U | 12/2019 |
| CN | 110891654 | A | 3/2020 |
| CN | 210174326 | U | 3/2020 |
| CN | 111184964 | A | 5/2020 |
| CN | 210750991 | U | 6/2020 |
| CN | 210750993 | U | 6/2020 |
| CN | 214129999 | U | 9/2021 |
| CN | 218944202 | U | 5/2023 |
| CN | 219307800 | U | 7/2023 |
| CN | 221815186 | U | 10/2024 |
| DE | 20122467 | U1 | 10/2005 |
| DE | 202016000506 | U1 | 5/2016 |
| EP | 0544199 | A1 | 6/1993 |
| EP | 1039187 | B1 | 4/2005 |
| RU | 2552901 | C1 | 6/2015 |
| TW | 201337178 | A | 9/2013 |
| WO | 2023228440 | A1 | 11/2023 |

OTHER PUBLICATIONS

Fire and explosion prevention, Fire prevention apparatus, Ed. Zhang, Northeast University Press, Nov. 2011, p. 121 with English translation. (4 pages).

* cited by examiner

FLAME ARRESTER CAPABLE OF AUTOMATICALLY ELIMINATING DEFECTS OF FIRE ARRESTING PORTION

CROSS REFERENCE TO RELATED APPLICATIONS

The present application claims for the benefits of Chinese Patent Application Nos. 202111121577.4, 202111123395.0, 202111121576.X and 202111123543.9 filed on Sep. 24, 2021, the contents of which are incorporated herein by reference.

FIELD

The present disclosure relates to the technical field of fire arrestment and explosion arrestment, in particular to a particle flame arrester capable of automatically eliminating the defects of a fire arresting portion.

BACKGROUND

As environmental protection standards become more stringent increasingly, chemical enterprises have begun to implement VOCs collection and treatment in oil storage systems on a large scale. A method used for that purpose is to connect multiple storage tanks in a tank farm or even all storage tanks in the tank farm into an integral structure through gas communication pipelines, and collect VOCs centrally for treatment. After the storage tanks are connected and communicated with each other, in the case of fire in a single storage tank, the flame will spread through the gas communication pipelines, posing a major risk of fire disaster in all the storage tanks. Therefore, to meet the increasing requirements for flame-retardant and explosion-proof techniques among complex pipelines, a main protective measure employed presently for gas communication pipelines of storage tanks is to install flame arresters, among which corrugated plate flame arresters are the most commonly used ones. However, since flame arresters are usually installed at the top of storage tanks and close to burning equipment, it is inconvenient to remove and install corrugated plate flame arresters. In addition, existing corrugated plate flame arresters also involve problems of being susceptible to blockage and difficult to clean, which may affect the operation of the process. Moreover, especially for large-size corrugated plate flame arresters, the fire arresting plates may be impacted apart and defected under detonation impacts, consequently fail to function any more.

SUMMARY

The object of the present disclosure is to provide a flame arrester that will not be blocked easily, is easy to remove and clean, and can automatically eliminate defects of a fire arresting portion. The flame arrester can automatically eliminate the defects of the fire arresting portion and continue to provide a normal flame-retardant and explosion-proof function in a case that the fire arresting portion is deformed to a certain extent due to detonation impacts on the flame arrester.

To attain the above object, the present disclosure provides a fire arrester capable of automatically eliminating defects of a fire arresting portion. The fire arrester comprises a fire arresting section, wherein the fire arresting section has a fire arresting section housing, the fire arresting section housing is hollow and fire arresting section openings are respectively formed at two ends of the fire arresting section housing, and two blocking portions are arranged at the fire arresting section openings so as to a fire arresting cavity between the two blocking portions, a plurality of openings are formed in each of the blocking portions, and the fire arresting cavity is filled with fire arresting particles: the fire arresting section further comprises a fire arresting particle replenishment structure, and the fire arresting particle replenishment structure is configured to automatically fill the fire arresting cavity with the fire arresting particles when a gap is generated in the fire arresting cavity. In a preferred scheme, the fire arresting particle replenishment structure comprises a replenishment port formed in the fire arresting section housing, a replenishment cylinder extending outward from a rim of the replenishment port, a replenishment cavity formed in the replenishment cylinder and communicated with the fire arresting cavity, and a piston portion and a spring arranged in the replenishment cavity, wherein the spring elastically abuts against the piston portion in a direction toward the fire arresting cavity, and clearance is formed between a rim of the piston portion and an inner wall of the replenishment cylinder to enable the piston portion to move in the replenishment cavity toward the fire arresting cavity.

Preferably, the fire arresting cavity comprises at least two zones in a direction from one of the fire arresting section openings to the other of the fire arresting section openings, and the particle size of the fire arresting particles filled in a first zone is greater than that of the fire arresting particles filled in a second zone; and the flame arrester capable of automatically eliminating defects of a fire arresting portion comprises at least one fire arresting particle replenishment structure in each of the zones.

Preferably, the two ends of the fire arresting section housing are respectively connected with a first housing and a second housing, and the first housing and the second housing are respectively provided with inner openings on sides facing each other, and are respectively provided with inner connecting flanges extending outward from rims of the inner openings: the flame arrestor capable of automatically eliminating defects of a fire arresting portion further comprises a connecting portion, and two ends of the connecting portion are respectively connected to the inner connecting flange of the first housing and the inner connecting flange of the second housing, so that the fire arresting section is sandwiched between the first housing and the second housing.

Preferably, the fire arresting section further comprises a fire arresting particle replacement structure, which comprises a fire arresting particle discharge port and a fire arresting particle replenishment port, wherein the fire arresting particle discharge port is formed at the bottom of the fire arresting section housing, the fire arresting particle replenishment port is formed at the top of the fire arresting section housing: the fire arresting section further comprises a discharge valve for controlling the opening and closing of the fire arresting particle discharge port and a replenishment valve for controlling the opening and closing of the fire arresting particle replenishment port.

The flame arrester capable of automatically eliminating defects of a fire arresting portion according to the present disclosure has a simple structure, and a particle-formed fire arresting material is used in the fire arresting section. The particle-formed fire arresting material has large relative surface area and large heat exchange area to facilitate heat conduction, and has high fire arresting performance: in addition, by using the particle-formed fire arresting material, the fire arresting section has advantages of being free of blockage and easy to clean. In addition, the fire arresting section according to the present disclosure further comprises a fire arresting particle replenishment structure. When the fire arresting particles are filled, the fire arresting particle replenishment structure enables the fire arresting particles to enter the replenishment cavity after they are filled into the fire arresting cavity, and the fire arresting particles move toward the outside of the fire arresting cavity against the piston portion and force the spring in a compressed state. When the flame arrester capable of automatically eliminating defects of a fire arresting portion is in normal use, the spring is always in a compressed state, and the fire arresting particles in the replenishment cavity remain in the replenishment cavity. When the flame arrester capable of automatically eliminate defects of a fire arresting portion is subjected to detonation impacts, the fire arresting particles in the fire arresting cavity may become more compact. If the blocking portions are defected under the impacts, a certain gap may appear in the fire arresting cavity (at the top): at that point, pushed by the compressed spring, the piston portion moves in the extension direction of the replenishment cavity, and pushes the fire arresting particles in the replenishment cavity into the fire arresting cavity, so that the gap in the fire arresting cavity is filled up, thereby the fire arresting cavity is fully filled with the fire arresting particles again, and any defect (gap) in the fire arresting portion is effectively prevented, so that the fire arresting portion will not lose its fire arresting ability. Thus, the flame arrester capable of automatically eliminating defects of a fire arresting portion according to the present disclosure can automatically eliminate defects of the fire arresting portion and continue to normally provide a flame-retardant and explosion-proof function in a case that the fire arresting portion is deformed due to detonation impacts on the flame arrester.

DETAILED DESCRIPTION

It should be noted that the embodiments of the present disclosure and the features in the embodiments can be combined freely, provided that there is no confliction among them.

In the present disclosure, it should be understood that the orientational or positional relationships indicated by terms "away from", "toward", "circumferential direction" and "axial direction", etc. are based on the orientational or positional relationships shown in the accompanying drawings, and correspond to the orientational or positional relationships in actual use: "inside and outside" refer to inside and outside of the outlines of the components, rather than specifying that the referred devices or components must have a specific orientation or must be constructed or operated in a specific orientation. Therefore, those terms shall not be understood as constituting any limitation to the present disclosure.

The present disclosure will be detailed below in embodiments with reference to the accompanying drawings.

Figure 1:
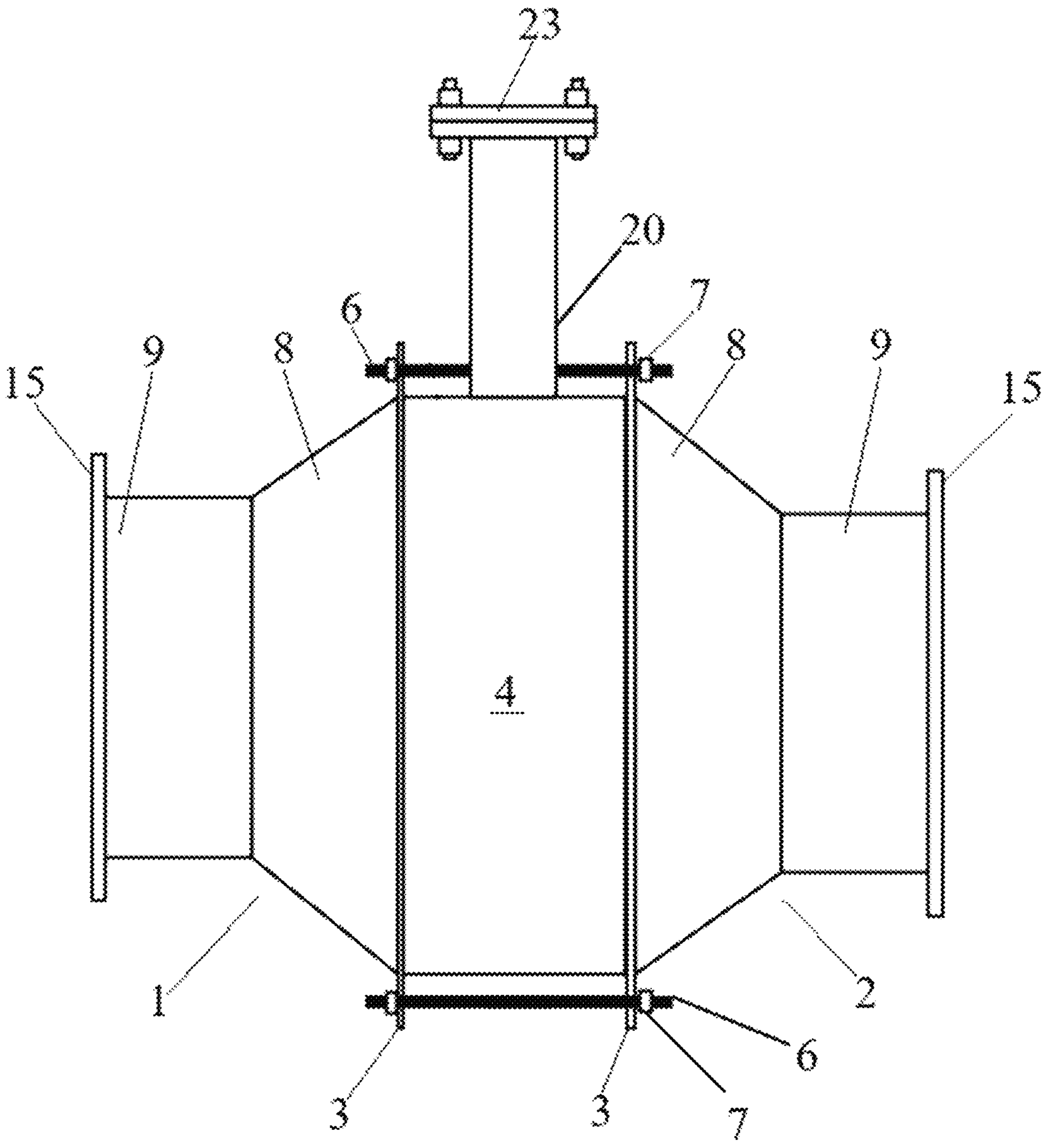
FIG. 1 is a schematic structural diagram of a flame arrester capable of automatically eliminating defects of a fire arresting portion according to an embodiment of the present disclosure.
Figure 2:
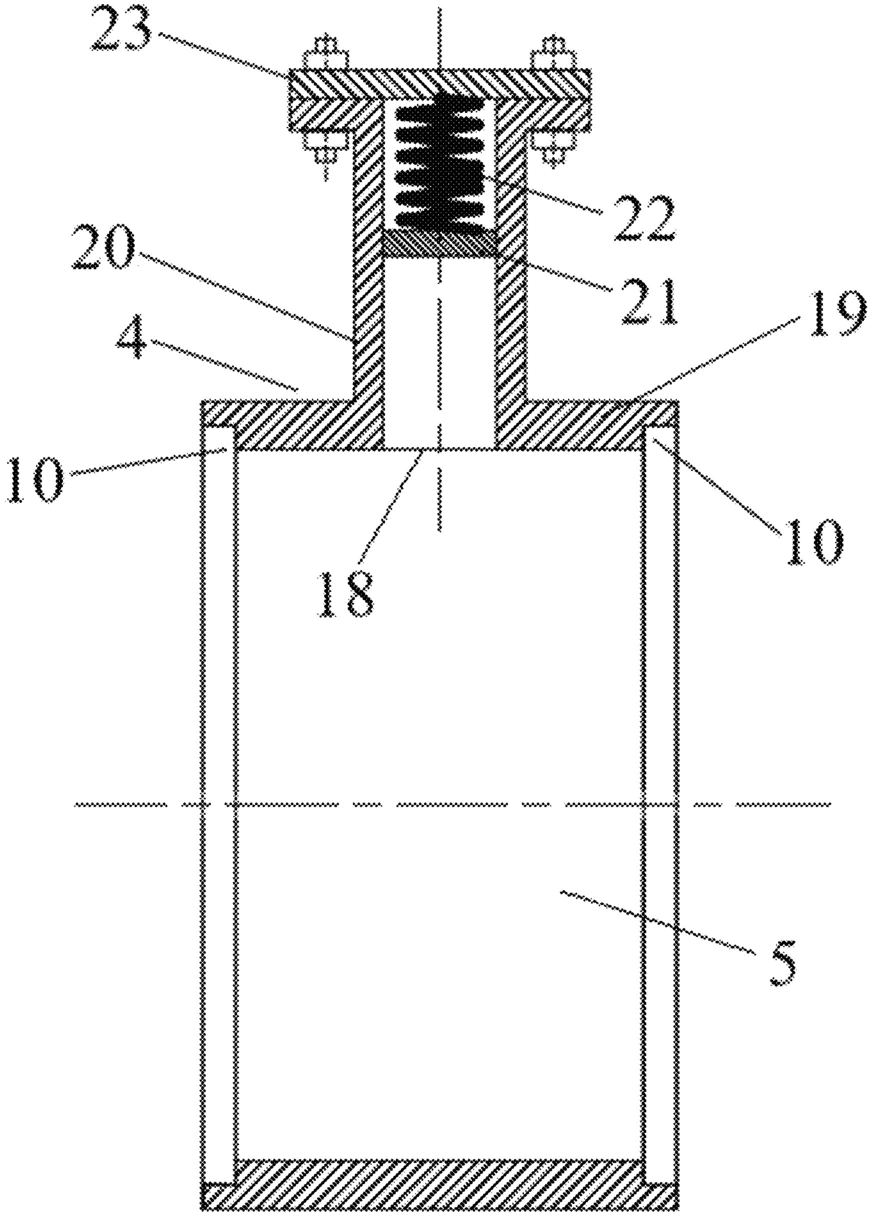
FIG. 2 shows a sectional view of the fire arresting section in the flame arrester capable of automatically eliminating defects of a fire arresting portion in FIG. 1 in the extension direction (axial direction), wherein the fire arresting cavity is not filled with fire arresting particles, and the blocking portions are not shown.
Figure 3:
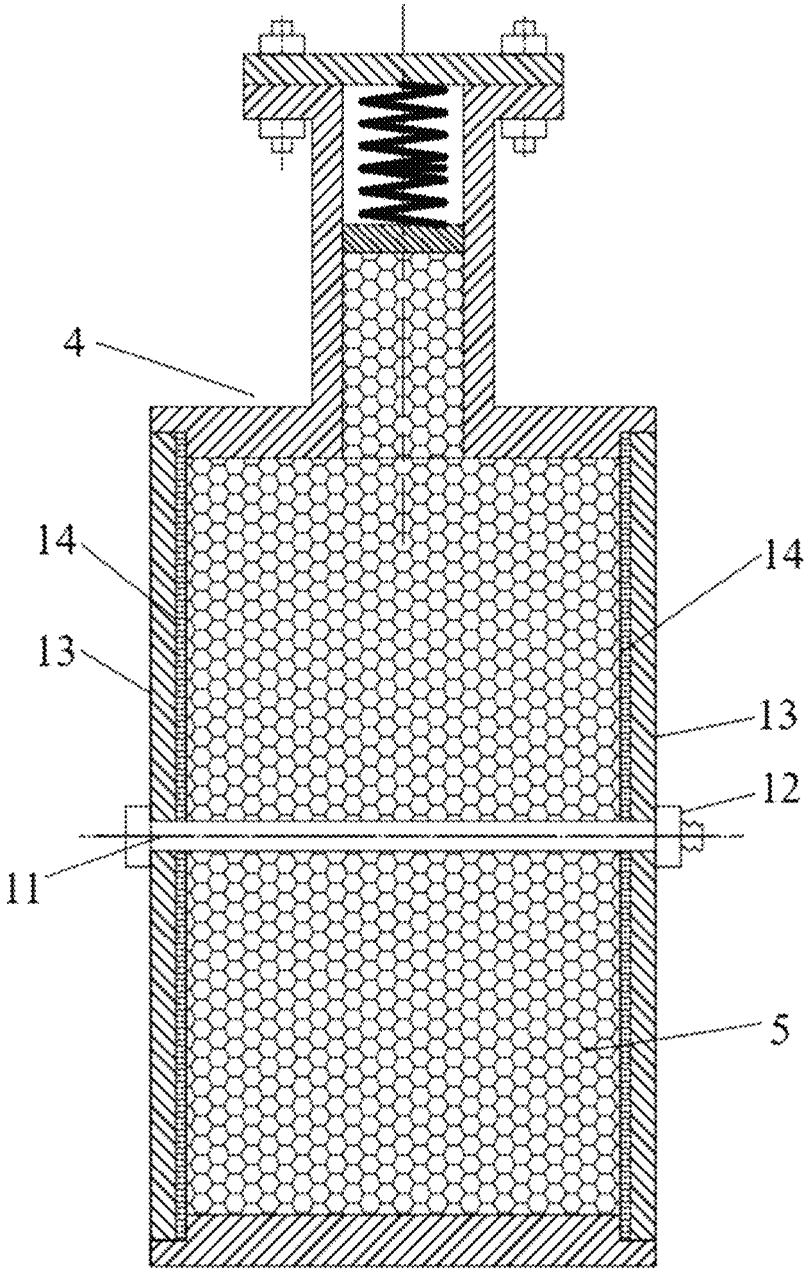
FIG. 3 shows a sectional view of the fire arresting section in the flame arrester capable of automatically eliminating defects of a fire arresting portion in FIG. 1 in the extension direction, wherein the fire arresting cavity and a part of the replenishment cavity are filled with fire arresting particles.

As shown in FIGS. 1-3, the present disclosure provides a flame arrester capable of automatically eliminating defects of a fire arresting portion. The flame arrester comprises a first housing 1, a second housing 2, and a fire arresting section 4 between the first housing 1 and the second housing 2, wherein the fire arresting section 4 is provided with a fire arresting section housing 19, and the fire arresting section housing 19 is hollow and has two fire arresting section openings that are oriented to the first housing 1 and the second housing 2 respectively: the fire arresting section 4 further comprises two blocking portions that are respectively arranged at the two fire arresting section openings so as to define a fire arresting cavity 5 between the two blocking portions: a plurality of openings are formed in each of the blocking portions, and the fire arresting cavity 5 is filled with fire arresting particles: the fire arresting section 4 further comprises a fire arresting particle replenishment structure, which comprises a replenishment port 18, a replenishment cylinder 20, a replenishment cavity, a piston portion 21 and a spring 22, wherein the replenishment port 18 is formed in the fire arresting section housing 19, the replenishment cylinder 20 extends outward (toward the outside of the fire arresting cavity 5) from a rim of the replenishment port 18, the replenishment cavity is formed inside the replenishment cylinder 20 and is communicated with the fire arresting cavity 5, the piston portion 21 and the spring 22 are located in the replenishment cavity, and clearance between a rim of the piston portion 21 and an inner wall of the replenishment cylinder 20 is not greater than the particle size of the fire arresting particles: one end of the spring 22 is connected with the piston portion 21, and the other end of the spring 22 is connected with the inner wall of an outer end of the replenishment cylinder 20.

In the flame arrestor according to the present disclosure, in a case of fire or explosion at one side of the flame arrestor, the flame passes through the first housing 1 or the second housing 2 first: then, when the flame flows through the flame arresting section 4, it flows from one fire arresting section opening to the other fire arresting section opening, and exchanges heat with the fire arresting particles in the fire arresting cavity 5, so that the temperature drops, and, at the same time, free radicals generated in the combustion reaction are quenched on the surfaces of the particles, so that the concentration of free radicals in the combustion reaction is decreased. The combustion will be terminated once the temperature and the concentration of free radicals are too low to maintain the combustion reaction. Thus, the fire or explosion is effectively prevented from spreading to the other side and causing more serious accidents.

The flame arrester capable of automatically eliminating defects of a fire arresting portion according to the present disclosure can eliminate defects of the fire arresting portion, has a simple structure, and a particle-formed fire arresting material is used in the fire arresting section 4. The particle-formed fire arresting material has large relative surface area and large heat exchange area to facilitate heat conduction, and has high fire arresting performance: in addition, by using the particle-formed fire arresting material, the fire arresting section 4 has advantages of being free of blockage and easy to clean. In addition, the fire arresting section 4 according to the present disclosure further comprises a fire arresting particle replenishment structure. When the fire arresting particles are filled, the fire arresting particle replenishment structure enables the fire arresting particles to enter the replenishment cavity after they are filled into the fire arresting cavity 5, and the fire arresting particles move toward the outside of the fire arresting cavity 5 against the piston portion 21 and force the spring 22 in a compressed state. When the flame arrester is in normal use, the spring 22 is always in a compressed state, and the fire arresting particles in the replenishment cavity remain in the replenishment cavity. When the flame arrester is subjected to detonation impacts, the fire arresting particles in the fire arresting cavity 5 may become more compact. If the blocking portions are defected under the impacts, a certain gap may appear in the fire arresting cavity 5 (at the top): at that point, pushed by the compressed spring 22, the piston portion 21 moves in the extension direction of the replenishment cavity, and pushes the fire arresting particles in the replenishment cavity into the fire arresting cavity 5, so that the gap in the fire arresting cavity 5 is filled up, thereby the fire arresting cavity 5 is fully filled with the fire arresting particles again, and any defect (gap) in the fire arresting section 4 is effectively prevented, so that the fire arresting section 4 will not lose its fire arresting ability. Thus, the flame arrester capable of automatically eliminating defects of a fire arresting portion according to the present disclosure can automatically eliminate defects of the fire arresting portion and continue to normally provide a flame-retardant and explosion-proof function in a case that the fire arresting portion is deformed due to detonation impacts on the flame arrester.

The replenishment cavity extends linearly and has a constant cross section in the extension direction. For example, the replenishment cavity may be in a shape of a straight cylinder, and may have a cross section in any suitable shape, such as a circle, an ellipse or a square, so that the piston portion 21 can smoothly move back and forth in the replenishment cavity.

Moreover, as shown in FIGS. 2 and 3, the piston portion 21 may be formed in a plate shape, and the extension direction of the piston portion 21 is perpendicular to the extension direction of the replenishment cavity.

As long as the clearance between the rim of the piston portion 21 and the inner wall of the replenishment cylinder 20 is not greater than the particle size of the fire arresting particles, the piston portion 21 can push the fire arresting particles to move, without causing the fire arresting particles to enter a portion of the replenishment cavity at outer side of the piston portion 21, thereby causing the fire arresting particle replenishment mechanism to fail. Generally speaking, the piston portion 21 may be disposed with its rim substantially close to the inner wall of the replenishment cylinder 20.

Moreover, to keep the fire arresting particle replenishment structure effective in a better way, preferably, the spring 22 is always in a compressed state when the piston portion 21 moves in the replenishment cavity in the extension direction of the replenishment cavity.

In addition, to facilitate the replenishment of the fire arresting particles in the fire arresting section 4 and the maintenance of the particle fire arresting replenishment structure, preferably, the outer end of the replenishment cylinder 20 has an outer end opening and an outer end plate 23 that detachably closes the outer end opening.

Furthermore, the rim of the outer end opening extends outward to form an outer end plate connecting flange, and the outer end plate 23 is connected to the outer end plate connecting flange by means of connecting elements. For example, a plurality of through-holes may be formed at the same interval in the circumferential direction of the outer end plate connecting flange, a plurality of through-holes are correspondingly formed in the outer end plate 23, and the outer end plate connecting flange is connected with the outer end plate 23 by means of bolts inserted through corresponding through-holes in the outer end plate connecting flange and the outer end plate 23 and nuts fitted with the bolts.

Figure 6:
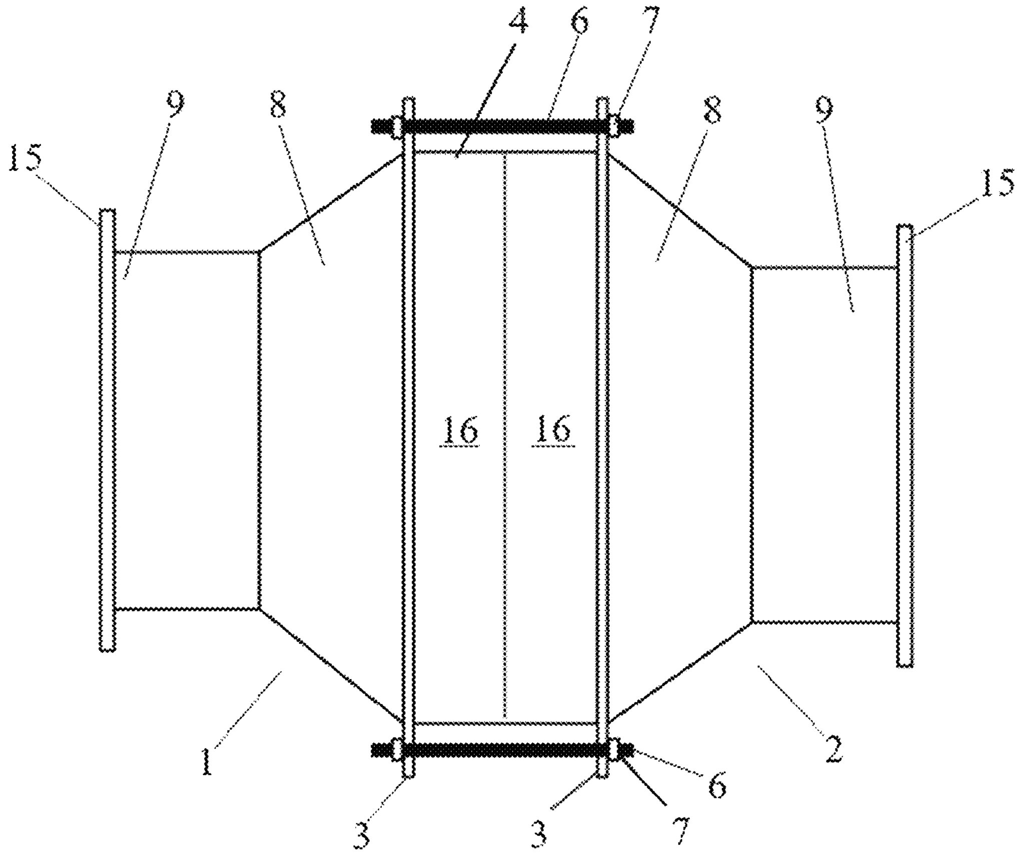
FIG. 6 is a schematic structural diagram of a flame arrester capable of automatically eliminating defects of a fire arresting portion according to another embodiment of the present disclosure.

FIG. 6 shows a fire arrester capable of automatically eliminating defects of a fire arresting portion in a preferred embodiment. The fire arrester may have a structure that is essentially the same as that of the embodiment shown in FIGS. 1 to 3, except the following differences: the fire arresting cavity 5 comprises at least two zones 16 in a direction from one of the fire arresting section openings to the other of the fire arresting section openings, and the particle size of the fire arresting particles filled in a first zone 16 is greater than that of the fire arresting particles filled in a second zone 16; and the flame arrester capable of automatically eliminating defects of a fire arresting portion comprises at least one fire arresting particle replenishment structure in each of the zones 16.

Each fire arresting particle replenishment structure replenishes fire arresting particles for a corresponding zone. In this embodiment, the fire arresting cavity 5 has a plurality of zones 16, so that the flame passes through the plurality of zones 16 sequentially in a direction from one of the fire arresting section openings to the other of the fire arresting section openings: specifically, the flame passes through the first zone first, and then passes through the second zone. In the first zone, the fire arresting particles have a greater particle size, and can decouple the pressure wave from the flame and transform the detonation into deflagration: this zone (bed) filled with fire arresting particles having a greater particle size is resistant to explosion impacts and has stronger deformation resistance. In the follow-up second zone, the fire arresting particles have a smaller particle size and higher thermal conductivity, and can decrease the flame temperature more quickly and realize flame quenching. Such a fire arresting section 4 provided with a plurality of zones can achieve better fire-retardant and explosion-proof effects.

Figure 7:
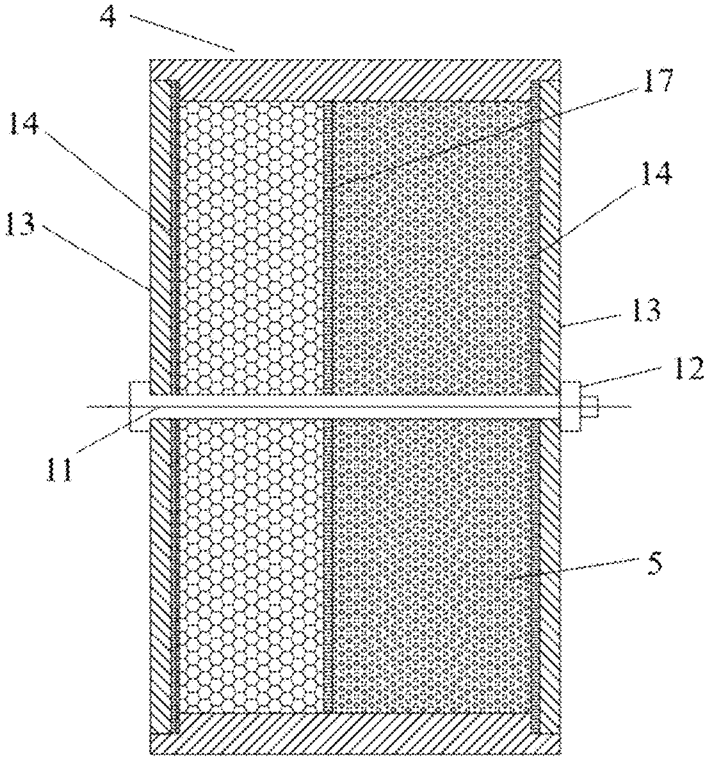
FIG. 7 shows a sectional view of an alternative fire arresting section in the fire arrester capable of automatically eliminating defects of a fire arresting portion in FIG. 6 in the extension direction.

As an embodiment, as shown in FIG. 7, the fire arresting cavity 5 may comprise two zones, and the particle size of the fire arresting particles in a first zone near the inlet side is greater than that of the fire arresting particles in a second zone near the outlet side. In this embodiment, the particle size of the fire arresting particles filled in the first zone 16 is 3 mm to 5 mm, and the particle size of the fire arresting particles filled in the second zone 16 is 1 mm to 2.5 mm.

Figure 8:
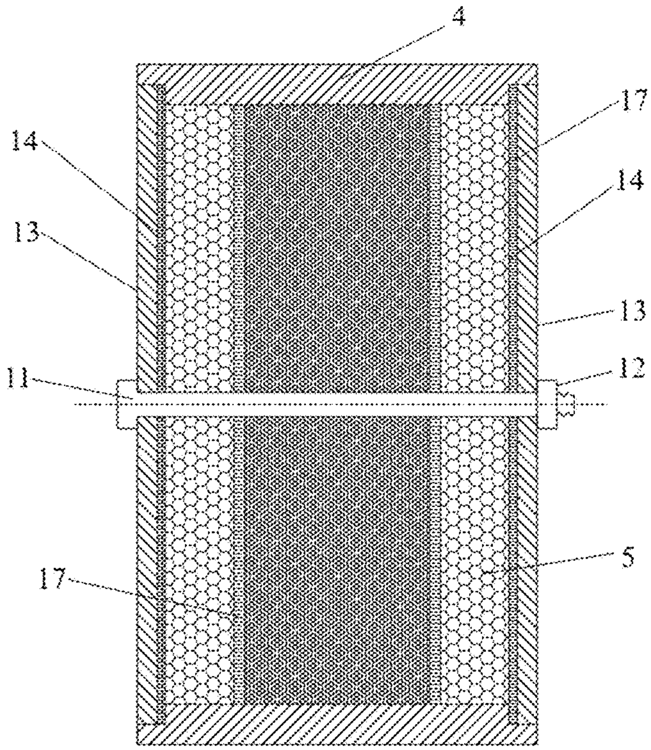
FIG. 8 shows a sectional view of another alternative fire arresting section in the fire arrester capable of automatically eliminating defects of a fire arresting portion in FIG. 6 in the extension direction.

Preferably, as shown in FIG. 8, the fire arresting cavity 5 may comprise at least three zones in the direction from one of the fire arresting section openings to the other of the fire arresting section openings; and the particle size of the fire arresting particles filled in an outer zone is greater than that of the fire arresting particles filled in an inner zone in a direction from the fire arresting section opening to the center. Thus, no matter whether the flame enters from the first housing 1 or enters from the second housing 2, good flam-retardant and explosion-proof effects can be achieved in the fire arresting section 4: here, the flame arrester is used as a particle flame arrester capable of automatically eliminating the defects of the fire arresting portion in two directions, and there is no requirement for the orientation of installation.

Optionally, the fire chamber 5 may comprise three zones 16: the particle sizes of the fire arresting particles filled in the zones at the two sides are equal and are greater than the particle size of the fire arresting particles filled in the zone in the middle. Here, the fire chamber 5 has a fully symmetric structure. For example, the particle sizes of the fire arresting particles filled in the zones 16 at the two sides may be 3 mm to 5 mm, while the particle size of the fire arresting particles filled in the zone 16 in the middle may be 1 mm to 2.5 mm.

Furthermore, the fire arresting section 4 may be a straight cylinder with two open ends, interfaces between the zones are perpendicular to the extension direction of the fire arresting section 4, and a separating wire mesh screen 17 extending along the interface is arranged at each interface to separate the fire arresting particles in the zones, thereby a plurality of fire arresting bed layers are formed. The separating wire mesh screen 17 may be a high-temperature resistant metal wire mesh screen: the extension direction of the replenishment cavity is perpendicular to the extension direction of the fire arresting section 4.

The fire arresting particles may be selected from one or a combination of the following substances: metal, metal-organic framework material, molecular sieve material, natural zeolite, and ceramic material.

The fire arresting particles in the zones 16 may be of the same material or different materials. For example, as an embodiment, the fire arresting cavity 5 comprises three zones, the fire arresting particles filled in the zones at the two sides are alumina ceramic particles having a particle size of 5 mm, while the fire arresting particles filled in the zone in the middle are stainless steel balls having a particle size of 2 mm. In another embodiment, the fire arresting cavity comprises three zones, the fire arresting particles filled in the zones at the two sides are of natural zeolite having a particle size of 4 mm, while the fire arresting particles filled in the zone in the middle are of a molecular sieve material having a particle size of 2.2 mm.

Furthermore, in the flame arrester capable of automatically eliminating defects of a fire arresting portion, the first housing 1 and the second housing 2 are respectively provided with inner openings on sides facing each other, and the first housing 1 and the second housing 2 are respectively provided with inner connecting flanges 3 extending outward from rims of the inner openings: the flame arrester capable of automatically eliminating defects of a fire arresting portion further comprises a connecting portion, the fire arresting sections 4 have two blocking portions respectively arranged at the two fire arresting section openings to define a flame arrestor cavity 5 between the two blocking portions, a plurality of openings are formed in each of the blocking portions, and two ends of the connecting portion are respectively connected to the inner connecting flange 3 of the first housing 1 and the inner connecting flange 3 of the second housing 2, so that the fire arresting section 4 is sandwiched between the first housing 1 and the second housing 2.

The fire arresting section 4 is sandwiched between the first housing 1 and the second housing 2 at the two sides, and is not directly connected with the first housing 1 or the second housing 2: instead, it is connected with the inner connecting flange 3 of the first housing 1 and the inner connecting flange 3 of the second housing 2 via the connecting portion, so that the fire arresting section 4 is confined between the first housing 1 and the second housing 2. Therefore, when the fire arresting section 4 is to be cleaned, repaired, or replaced, the fire arresting section 4 can be removed simply by disconnecting the connecting portion. Since the connecting portion is located on the inner connecting flanges extending outward from the rims of the inner openings of the first housing 1 and the second housing 2, it is easier to remove and mount the connecting portion, thereby the convenience of removing and mounting the flame arrester is improved. In addition, with the multi-section structure in which each section can be independently processed, the processing difficulty and cost of the flame arrester are reduced.

Optionally, first connecting through-holes are respectively formed in the inner connecting flange 3 of the first housing 1 and the inner connecting flange 3 of the second housing 2 in a manner that the first connecting through-holes correspond to each other, the connecting portion comprises a first connecting rod 6 and a first nut 7, wherein the first connecting rod 6 is formed with a first threaded section at one end and is formed with another first threaded section or a first cap nut at the other end, the first nut 7 can be fitted on the first threaded section, the first connecting rod 6 is inserted through the first connecting through-holes in the first housing 1 and the second housing 2, and both the first nut 7 and the first cap nut have a maximum outer diameter greater than a maximum inner diameter of the first connecting through-hole at the corresponding side.

In the above scheme, the first nut 7 and the first connecting rod 6 form a connecting portion, which makes the removal and mounting of the fire arresting section 4 more convenient. The above scheme encompasses two embodiments. In a first embodiment, both ends of the first connecting rod 6 have a first threaded section, and both of the first threaded sections can be fitted with a first nut 7: after the first connecting rod 6 is inserted through the first connecting through-holes in the first housing 1 and the second housing 2, the first housing 1 and the second housing 2 can be connected with each other by tightening up the first nuts 7 on the first threaded sections at the two ends so that the two first nuts 7 achieve a limiting function: the first nut 7 at either side may be unscrewed to remove the first connecting rod 6. In a second embodiment, one end of the first connecting rod 6 is configured into a first threaded section and the other end of the first connecting rod 6 is provided with a cap nut: after the first connecting rod 6 is inserted through the first connecting through-holes in the first housing 1 and the second housing 2, the first housing 1 and the second housing 2 can be connected with each other by tightening up the first nut 7 on the first threaded section so that the first nut 7 and the cap nut achieves a limiting function: the first nut 7 may be unscrewed to remove the first connecting rod 6. In this embodiment, the operation for connecting the first housing 1 and the second housing 2 is more convenient and the stability is optimized owing to the existence of the fixed cap nut.

In addition, at least two connecting portions as shown in FIG. 1 should be provided in the circumferential direction of the fire arresting section 4, in order to stably clamp the fire arresting section 4 between the first housing 1 and the second housing 2.

Moreover, specifically, the fire arresting section 4 may be in a shape of a straight cylinder, and the first connecting rod 6 extends in the extension direction of the fire arresting section 4. For example, the fire arresting section 4 may be in a cylindrical shape, and the first connecting rod 6 extends in the axial direction of the fire arresting section 4, which is beneficial to further improving the stability of connection between the first housing 1 and the second housing 2.

Preferably, a plurality of connecting portions are arranged in the circumferential direction of the inner connecting flanges 3 of the first housing 1 and the second housing 2, so as to further improve the stability of connection between the first housing 1 and the second housing 2. For example, a plurality of connecting portions comprising the first connecting rod 6 and the first nut 7 respectively may be arranged in the circumferential direction of the inner connecting flanges 3 of the first housing 1 and the second housing 2, and the plurality of connecting portions may be arranged at the same interval in the circumferential direction of the inner connecting flanges 3 of the first housing 1 and the second housing 2.

Furthermore, as shown in FIG. 1, in this embodiment, each of the first housing 1 and the second housing 2 has an expansion section 8 at the side of the inner opening, and the expansion section 8 is formed to have cross-sectional area gradually increased in a direction toward the inner opening. Thus, in a case of fire or explosion at one side of the flame arrester, the flame passes through the expansion section 8 of the first housing 1 or the second housing 2 first: then, since the cross-sectional area of the expansion section 8 is gradually increased in the direction toward the fire arresting section 4, the flow area of the flame is gradually increased, and the advance rate and pressure of the flame are decreased, thereby the flame-retardant and explosion-proof effects can be improved.

Further specifically, as shown in FIG. 1, in this embodiment, the expansion section 8 is formed into a truncated conical cylinder with two open ends, the first housing 1 and the second housing 2 further respectively comprise a cylindrical section 9 connected to the expansion section 8, and the cylindrical section 9 extends from an edge of the expansion section 8 on a side away from the inner opening in a direction away from the inner opening along a rotation axis of the truncated conical cylinder: accordingly, the fire arresting section 4 is in a cylindrical shape.

A ratio of the inner diameter of the expansion section 8 at the end near the inner opening to the inner diameter of the expansion section 8 at the end away from the inner opening is preferably controlled to be 1.5-4, so that the advance rate and pressure of the flame can be decreased better, and, at the same time, the processing difficulty and cost of the expansion section 8 will not be too great and the structural stability of the flame arrester will not be compromised. Further preferably, the ratio of the inner diameter of the expansion section 8 at the end near the inner opening to the inner diameter of the expansion section 8 at the end away from the inner opening is preferably controlled to be 2.2-2.8.

Moreover, preferably, the first housing 1 and the second housing 2 have mutually symmetric structures. For example, as shown in FIG. 1, the shapes and dimensions of the first housing 1 and the second housing 2 are fully symmetric, the outer diameter of the cylindrical fire arresting section 4 is approximately equal to the outer diameter of the expansion section 8 at the inner opening, and the first housing 1, the second housing 2 and the fire arresting section 4 are coaxially arranged. Furthermore, the inner connecting flange 3 is perpendicular to the rotation axis of the truncated conical cylinder, which is beneficial to improving the stability of connection between the first housing 1 and the second housing 2.

A gasket may be provided between the fire arresting section 4 and the inner connecting flange 3: the first housing 1 and the second housing 2 may be further provided with mounting flanges 15 on sides facing away from each other, so as to mount the flame arrestor capable of automatically eliminating defects of a fire arresting portion onto a corresponding pipeline or device.

As shown in FIG. 2, preferably, grooves 10 are formed in side walls of the two ends of the fire arresting section 4 in a circumferential direction of the fire arresting section opening, and the blocking portions are mounted in the grooves 10.

The blocking portions may be interference-fitted in the grooves 10, so that the blocking portions may be connected to the body of the fire arresting section without using any other connector.

Optionally, second connecting through-holes are respectively formed in the blocking portions at the two ends of the fire arresting section 4 in a manner that the second connecting through-holes correspond to each other, the fire arresting section 4 further comprises a second connecting rod 11 and a second nut 12, wherein the second connecting rod 11 is formed with a second threaded section at one end and is formed with another second threaded section or a second cap nut at the other end, and the second nut 12 can be fitted on the second threaded section: the second connecting rod 11 is inserted through the second connecting through-holes in the blocking portions at the two ends of the fire arresting section 4, and both the second nut 12 and the second cap nut have a maximum outer diameter greater than a maximum inner diameter of the second connecting through-hole at the corresponding side.

In the above scheme, utilizing the second connecting rod 11 and the second nut 12, the blocking portions can be removed and mounted more conveniently. The above scheme encompasses two embodiments. In a first embodiment, both ends of the second connecting rod 16 have a second threaded section, and both of the second threaded sections can be fitted with a second nut 12: after the second connecting rod 11 is inserted through the second connecting through-holes in the two blocking portions, the blocking portions at the two ends can be connected with the body of the fire arresting section in the middle by tightening up the second nuts 12 on the second threaded sections at the two ends so that the two second nuts 12 achieve a limiting function: the second nut 12 at either side may be unscrewed to remove the second connecting rod 11. In a second embodiment, the second connecting rod 11 is provided with a second threaded section at one end and a cap nut at the other end. After the second connecting rod 11 is inserted through the second connecting through-holes in the two blocking portions, the blocking portions at the two ends can be connected to the body of the fire arresting portion in the middle by tightening up the second nut 12 on the second threaded section so that the second nut 12 and the cap nut achieve a limiting function: the second nut 12 can be unscrewed to remove the second connecting rod 11: in this embodiment, the operation for connecting the two blocking portions to the fire arresting section in the middle can be more convenient and the stability of connection can be optimized, owing to the existence of the fixed cap nut.

Preferably, at the two ends of the fire arresting section 4, the rim of the blocking portion abuts against the inner connecting flange 3 at the corresponding side. From the above-mentioned structural feature that the fire arresting section 4 has grooves 10 formed in the side walls at the two ends in the circumferential direction of the fire arresting section opening and the blocking portions are mounted in the grooves 10, it can be understood that the blocking portions are also subjected to a limiting action of the inner connecting flanges 3 at corresponding sides when the fire arresting section 4 is sandwiched between the first housing 1 and the second housing 2. Thus, the blocking portions have better structural stability and enhanced explosion-proof ability, and will not be deformed easily.

In order to improve the explosion-proof and deformation resistance performance of the blocking portion, preferably the blocking portion comprises a rigid baffle 13: furthermore, the blocking portion may further comprise a wire mesh screen 14 disposed at an inner side of the baffle 13. The wire mesh screen 14 may be a high-temperature resistant mesh wire mesh screen for confining the fire arresting particles in the fire arresting cavity 5, and the baffle 13 may be used as a rigid supporting structure, so that the blocking portion has better structural stability and enhanced explosion-proof ability, and will not be deformed easily.

The mesh size of the wire mesh screen 14 may be determined according to the particle size of the fire arresting particles in the fire arresting cavity 5.

It can be understood that the opening in the baffle 13 may be in any size in the case that the wire mesh screen 14 is provided. For example, three types of baffles 13 that can be selected are shown in FIGS. 5A to 5C respectively, and all the three types of baffles 13 can be used in combination with the wire mesh screen 14 in FIG. 4. These wire mesh screen 14 and baffles 13 are provided for the body of a cylindrical fire arresting section. Since the body of a cylindrical fire arresting section has circular ends, the baffles 13 and the wire mesh screen 14 have circular outer contours. The outer contours of the baffles 13 and the wire mesh screen 14 may vary accordingly with the outer contour of the body of the fire arresting section. The baffle 13 has a circumferential frame and at least one inner frame (corresponds to the cylindrical fire arresting section 4, and is an annular frame in the figure) fitted in the circumferential frame. The baffle 13 further comprises radial connecting rods connecting the inner frame and the circumferential frame: a plurality of radial connecting rods are arranged at an interval in the circumferential direction of the baffle 13. In the illustrated case, the radial connecting rods extend radially from the center to the edges of the baffle 13. For the connection between the wire mesh screen 14 and the baffle 13, in this embodiment, both the baffle 13 and the wire mesh screen 14 have a connecting through-hole at the center for the second connecting rod 11 to pass through, so as to connect the baffle 13 and the wire mesh screen 14 together. Of course, the wire mesh screen 14 may additionally or separately be connected to the baffle 13 by other connecting means. Of course, it can be understood that the baffle 13 may be configured in any other suitable form. For example, as shown in FIG. 5D, the baffle 13 is formed in a grill shape. If the clearance between the grills of the grill-shaped baffle 13 is smaller than the particle size of the fire arresting particles, the wire mesh screen 14 may be omitted and only the baffle 13 can be provided separately.

In the flame arrester capable of automatically eliminating defects of a fire arresting portion, in case of fire or explosion at one side of the flame arrester, the flame passes through the first housing 1 or the second housing 2 first: especially, if the expansion section 8 exists, since the cross-sectional area of the expansion section 8 is gradually increased in a direction toward the fire arresting section 4, the flow area of the flame is gradually increased, and the advance rate and pressure of the flame are gradually decreased: then, when the flame flows through the fire arresting section 4, the flame exchanges heat with the fire arresting particles in the fire arresting cavity 5, and the temperature drops. At the same time, the free radicals generated in the combustion reaction are quenched on the surfaces of the particles, so that the concentration of the free radicals in the combustion reaction is reduced. When the temperature and the concentration of free radicals are too low to maintain the combustion reaction, the combustion is terminated, thereby the flame or explosion is effectively prevented from spreading to the other side and causing greater accidents.

For the selection of the fire arresting particles, in addition to the materials described above, the shapes of the fire arresting particles include but are not limited to spheres, ellipsoids, etc., so that fine flow channels can be formed among the fire arresting particles, and gas can flow along those flow channels. Generally speaking, it is required that the flow channels formed among the fire arresting particles should meet the requirement of explosion-proof rating. For example, if the explosion-proof rating is IIA, it is required that the flow channel should not be greater than 0.85: if the explosion-proof rating is IIB3, it is required that the flow channel should not be greater than 0.6; if the explosion-proof rating is IIB3, it is required that the flow channel should not be greater than 0.4. More specifically, for example, the fire arresting particles may spherical metal particles having a particle size of 2 mm, so that flow channels in 0.73 mm diameter can be formed among the spherical metal particles filled in the fire arresting cavity 5, in order to meet the working condition of explosion-proof rating IIA. Under a normal working condition, gas flows from the outer opening on one side of the housing into the fire arresting section 4 through the expansion section 8, and then flows through the circulation channels formed among the fire arresting particles, then flows through the contraction section 8 on the other side of the housing and flows out of the outer opening on the other side of the housing.

Figure 9:
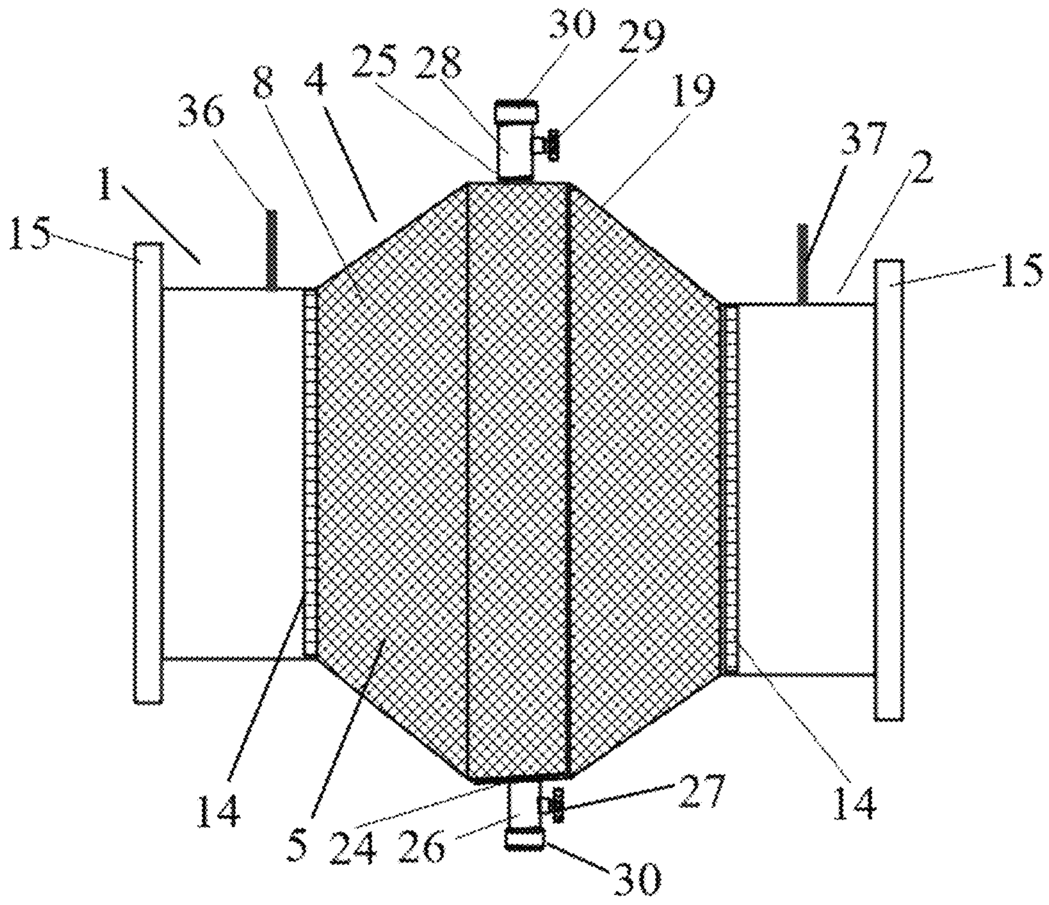
FIG. 9 is a schematic structural diagram of a flame arrester capable of automatically eliminating defects of a fire arresting portion according to yet another embodiment of the present disclosure, wherein the material barrel is not shown.

As shown in FIG. 9, the present disclosure provides a flame arrester that supports online replacement of fire arresting particles and is capable of automatically eliminating defects of a fire arresting portion. The flame arrester comprises a first housing 1, a second housing 2, and a fire arresting section 4 between the first housing 1 and the second housing 2, wherein the fire arresting section 4 is provided with a fire arresting section housing 19, and the fire arresting section housing 19 is hollow and has two fire arresting section openings that are oriented to the first housing 1 and the second housing 2 respectively: the fire arresting section 4 further comprises two blocking portions that are respectively arranged at the two fire arresting section openings so as to define a fire arresting cavity 5 between the two blocking portions: a plurality of openings are formed in each of the blocking portions, and the fire arresting cavity 5 is filled with fire arresting particles: the fire arresting section 4 further comprises a fire arresting particle replacement structure, which comprises a fire arresting particle discharge port 24 and a fire arresting particle replenishment port 25, wherein the fire arresting particle discharge port 24 is formed at the bottom of the fire arresting section housing 19, the fire arresting particle replenishment port 25 is formed at the top of the fire arresting section housing 19; and the fire arresting section 4 further comprises a discharge valve 27 for controlling the opening and closing of the fire arresting particle discharge port 24 and a replenishment valve 29 for controlling the opening and closing of the fire arresting particle replenishment port 25.

According to the present disclosure, with the fire arresting particle replacement structure arranged in the fire arresting section 4, to replace the fire arresting particles in the fire arresting cavity 5, the discharge valve 27 can be opened first, and the fire arresting particles in the fire arresting cavity 5 can be discharged from the fire arresting particle discharge port 24: after all the fire arresting particles in the fire arresting cavity 5 are discharged, the discharge valve 27 can be closed, then the fire arresting particle replenishment port 25 can be opened by controlling the replenishment valve 29, and new fire arresting particles can be replenished into the fire arresting cavity 5 through the fire arresting particle replenishment port 25: after the filling, the replenishment valve 29 can be controlled to close the fire arresting particle replenishment port 25, so that the fire arrester that supports online replacement of fire arresting particles can be put into use again. In the process of replacing the fire arresting particles, it is unnecessary to remove the flame arrester from the pipeline, tank or device, and the fire arresting particles can be replaced online conveniently.

Specifically, in some embodiments, the fire arresting particle replacement structure comprises a discharge channel 26 extending from the fire arresting particle discharge port 24, and the discharge valve 27 is mounted on the discharge channel 26: the fire arresting particle replacement structure further comprises a replenishment channel 28 extending from the fire arresting particle replenishment port 25, and the replenishment valve 29 is mounted on the replenishment channel 28. In order to facilitate the conveyance of the fire arresting particles in the channels, both the discharge channel 26 and the replenishment channel 28 are straight cylinders extending in the vertical direction. Furthermore, in the figures, both the discharge channel 26 and the replenishment channel 28 are formed in a tubular shape.

Figure 10:
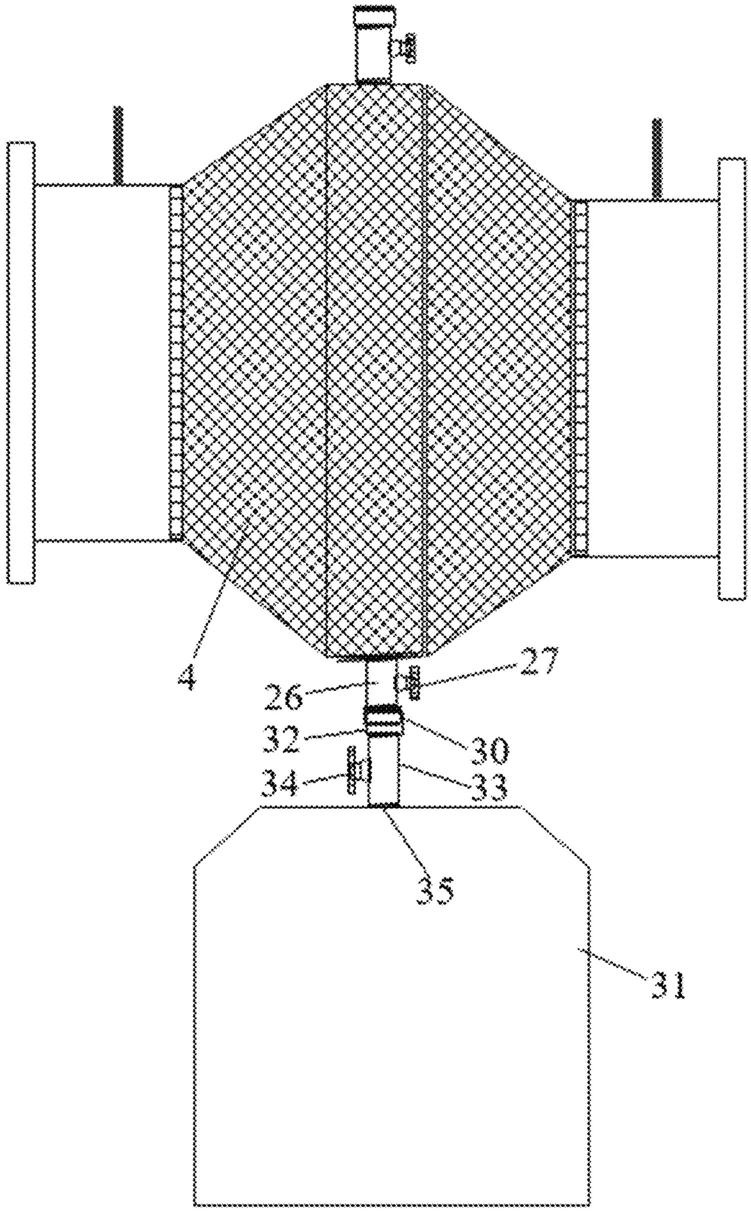
FIG. 10 is a schematic diagram of the flame arrester capable of automatically eliminating defects of a fire arresting portion in FIG. 9 when flame retardant particles are discharged.
Figure 11:
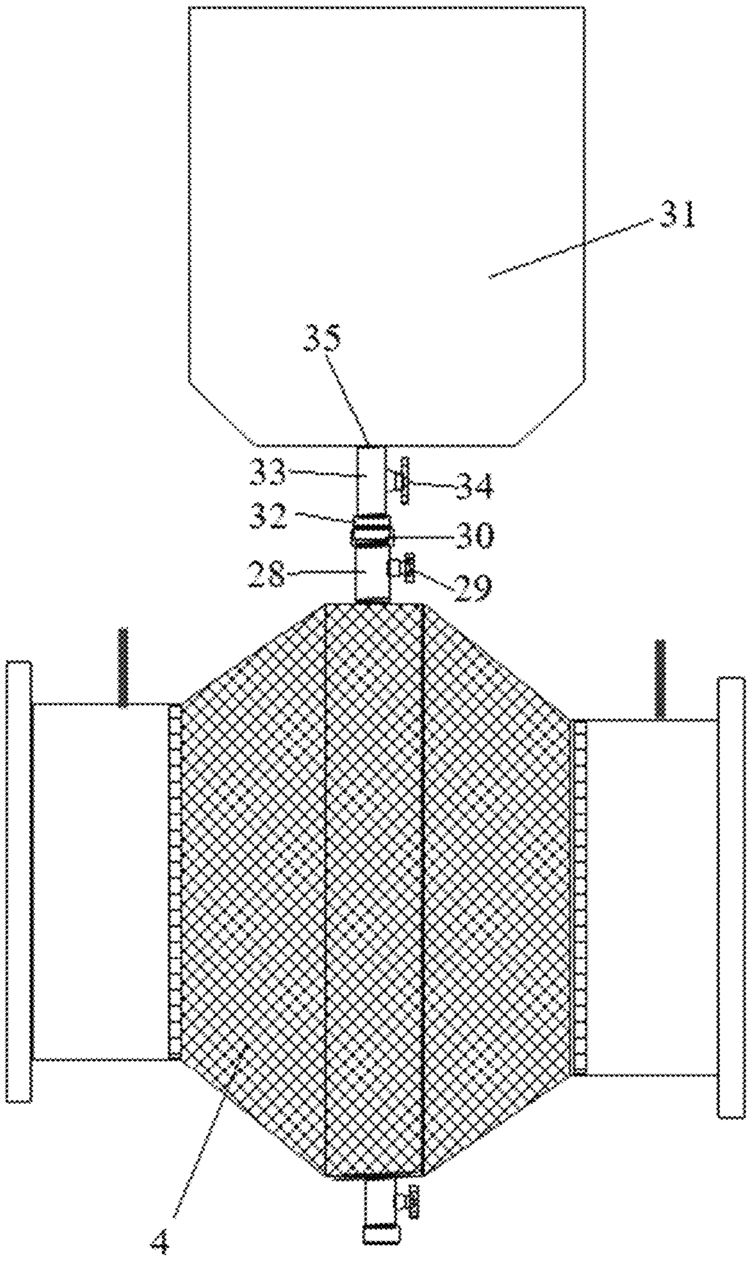
FIG. 11 is a schematic diagram of the flame arrester capable of automatically eliminating defects of a fire arresting portion in FIG. 9 when flame retardant particles are replenished.

Preferably, the fire arresting particle replacement structure further comprises a fire arresting section connector 30 arranged at an outer end of the discharge channel 26 and/or an outer end of the replenishment channel 28. As shown in FIGS. 10 and 11, the flame arrester that supports online replacement of fire arresting particles may further comprises a material barrel 31, and a material barrel connector 32 that can be fitted and connected with the fire arresting section connector 30 is arranged on the material barrel 31. The material barrel 31 is used to hold fire arresting particles to be filled into the fire arresting cavity 5 or receive fire arresting particles discharged from the fire arresting cavity 5, and the material barrel 31 can be connected with the fire arresting section 4 quickly by means of a fitting and connecting structure between the fire arresting section connector 30 and the material barrel connector 32. For example, both the fire arresting section connector 30 and the material barrel connector 32 may employ a tie rod quick connector to realize quick connection without any tool.

Furthermore, in some embodiments, the material barrel 31 has a first material barrel opening 35 and a material barrel channel 33 extending from the first material barrel opening 35, and the material barrel channel 33 is provided with a material barrel valve 34 for controlling the opening and closing of the first material barrel opening 35: the material barrel connector 32 is arranged at an outer end of the material barrel channel 33. In addition, in order to facilitate the fire arresting particles to enter the material barrel 31 or be discharged from the material barrel 31, the material barrel channel 33 may be in a shape of a straight cylinder, for example, as shown in the figure.

Furthermore, in some embodiments, the material barrel 31 further has a second material barrel opening and a material barrel cover for detachably closing the second material barrel opening. For example, the second material barrel opening may be opposite to the first material barrel opening 35 and may be greater. For example, the material barrel 31 may be fully open at a side opposite to the first material barrel opening 35, so that new fire arresting particles can be conveniently replenished into the material barrel 31, or waste fire arresting particles held in the material barrel 31 can be discharged conveniently.

In some embodiments, two material barrels 31 may be provided for fitting and connecting with the discharge channel and the replenishment channel respectively.

As shown in FIG. 9, in some embodiments, the flame arrester that supports online replacement of fire arresting particles further comprises a pressure difference detection portion for detecting a pressure difference between the pressure of the gas entering the fire arresting section 4 and the pressure of the gas discharged from the fire arresting section 4. Thus, the working condition of the fire arresting section 4 can be monitored by means of the pressure difference detection portion. If the fire arresting section 4 is blocked and can't operate normally anymore, the pressure difference value detected by the pressure difference detection portion will be increased, and workers can judge whether the fire arresting section 4 is blocked or not and whether the fire arresting particles in the fire arresting cavity 5 should be replaced according to the detected pressure difference value.

For example, optionally, the pressure difference detection portion comprises a first pressure detector 36 and a second pressure detector 37, wherein the first pressure detector 36 is mounted on the first housing 1 and a detection probe of the second pressure detector 37 extends into the cavity of the first housing 1, and the second pressure detector 37 is mounted on the second housing 2 and a detection probe of the second pressure detector 37 extends into the cavity of the second housing 2.

Preferably, the first pressure detector 36 and the second pressure detector 37 are mounted as close as possible to the fire arresting section 4, and the flame arrester that supports online replacement of fire arresting particles may further comprise a control unit and an alarm unit, a signal output end of the pressure difference detection portion may be electrically connected to an signal input end of the control unit, and an signal output end of the control unit may be electrically connected to an signal input end of the alarm unit. After receiving the pressure difference detected by the first pressure detector 36 and the second pressure detector 37, the control unit judges whether the fire arresting particles should be replaced. For example, when the pressure difference reaches a certain value, a signal is sent to the alarm unit, so that the alarm unit gives an alarm to remind workers to replace the fire arresting particles.

Figure 12:
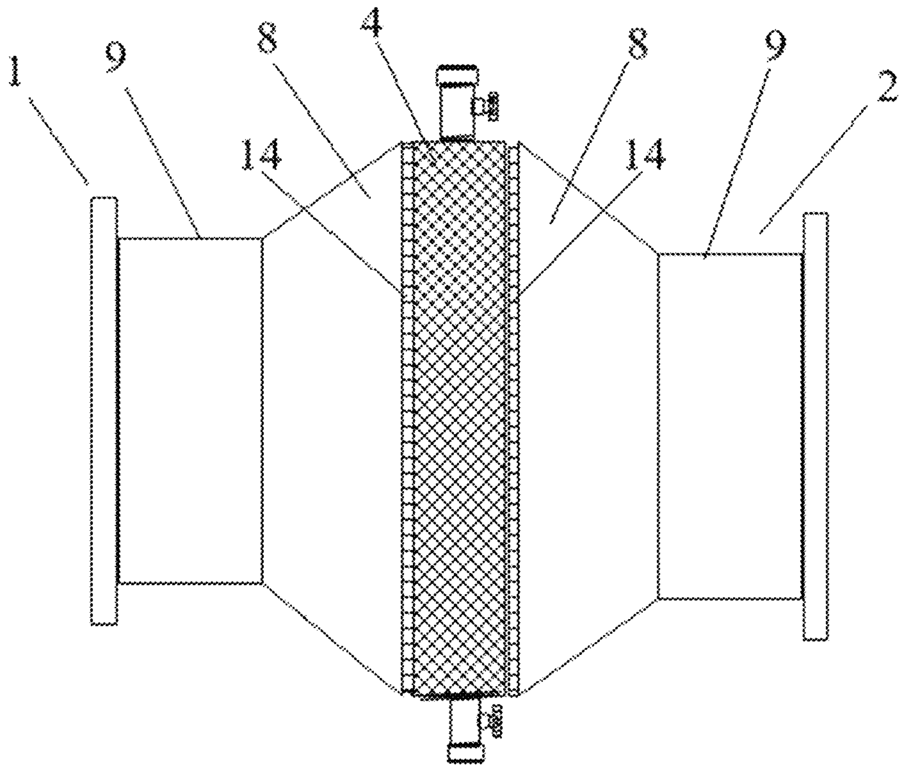
FIG. 12 is a schematic structural diagram of a flame arrester capable of automatically eliminating defects of a fire arresting portion according to yet another embodiment of the present disclosure, wherein the material barrel is not shown.
Figure 13:
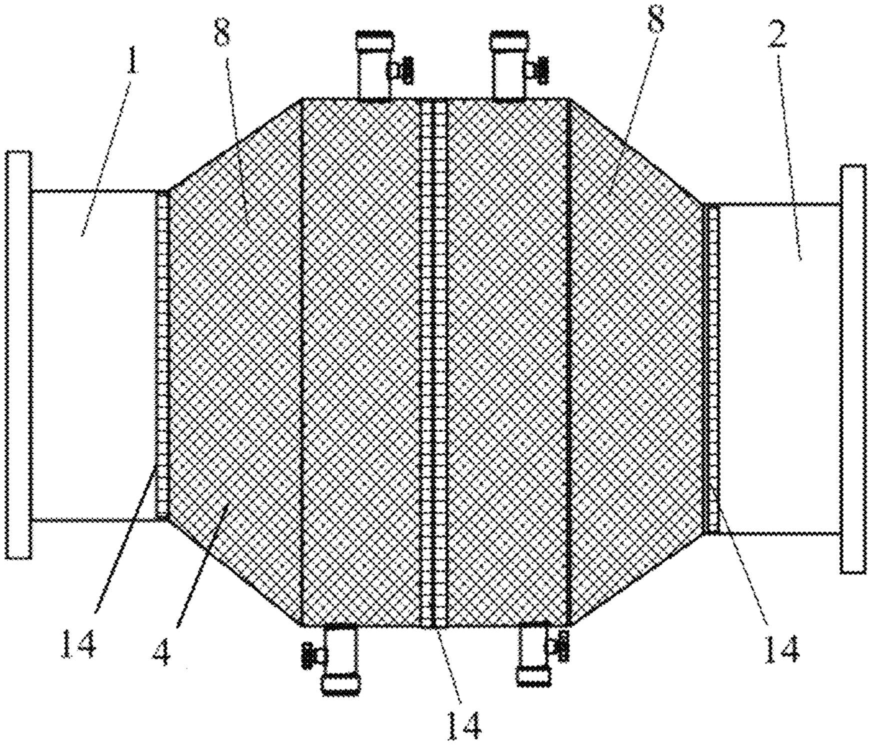
FIG. 13 is a schematic structural diagram of a flame arrester capable of automatically eliminating defects of a fire arresting portion according to yet another embodiment of the present disclosure, wherein the material barrel is not shown.

In the preferred embodiment shown in FIG. 12, in the flame arrester that supports online replacement of fire arresting particles, the first housing 1 and the second housing 2 have inner openings at the sides facing each other respectively, and both the first housing 1 and the second housing 2 have an expanding section 8 at the side of the inner opening, and the expanding section 8 is formed to have cross-sectional area gradually increased in a direction toward the inner opening. In another preferred embodiment shown in FIG. 13, both ends of the fire arresting section housing 19 may have an expansion section 8, which is formed to have cross-sectional area gradually increased in a direction away from the blocking portion.

Thus, in the case of fire or explosion at one side of the flame arrester that supports online replacement of fire arresting particles, the flame passes through the first housing 1 or the second housing 2 first, and then enters the expansion section 8 before it enters the fire arresting section 4. As the cross-sectional area of the expansion section 8 is gradually increased in the direction away from the blocking portion, the flow area of the flame is gradually increased, and the advance rate and pressure of the flame are gradually decreased, which is beneficial to improving the fire-retardant and explosion-proof effects.

More specifically, in this embodiment, the expansion section 8 is formed into a truncated conical cylinder with two open ends, and the fire arresting section housing 19 further has a cylindrical section between two the expansion sections 8. Moreover, a ratio of the inner diameter of the expansion section 8 at the end having greater cross-sectional area to the inner diameter of the expansion section 8 at the end having smaller cross-sectional area is preferably controlled to be 1.2-2, so that the advance rate and pressure of the flame can be decreased better, and, at the same time, the processing difficulty and cost of the expansion section 8 will not be too great and the structural stability of the flame arrester that supports online replacement of fire arresting particles will not be compromised. Further preferably, the ratio of the inner diameter of the expansion section 8 at the end having greater cross-sectional area to the inner diameter of the expansion section 8 at the end having smaller cross-sectional area is preferably controlled to be 1.4-1.7.

The present disclosure will be further detailed below in embodiments, which are only used to describe the technical scheme of the present disclosure better, but are not intended to limit the present disclosure.

Embodiment 1

A flame arrester capable of automatically eliminating defects of a fire arresting portion, comprising a first housing, a second housing, and a fire arresting section between the first housing and the second housing, wherein the fire arresting section is provided with a fire arresting section housing, and the fire arresting section housing is hollow and has two fire arresting section openings that are oriented to the first housing and the second housing respectively: the fire arresting section further comprises two blocking portions that are respectively arranged at the two fire arresting section openings so as to define a fire arresting cavity between the two blocking portions: a plurality of openings are formed in each of the blocking portions, and the fire arresting cavity is filled with fire arresting particles: the fire arresting section further comprises a fire arresting particle replenishment structure, which comprises a replenishment port, a replenishment cylinder, a replenishment cavity, a piston portion and a spring, wherein the replenishment port is formed in the fire arresting section housing, the replenishment cylinder extends outward from a rim of the replenishment port, the replenishment cavity is formed inside the replenishment cylinder and is communicated with the fire arresting cavity, the piston portion and the spring are located in the replenishment cavity, and clearance between a rim of the piston portion and an inner wall of the replenishment cylinder is not greater than the particle size of the fire arresting particles: one end of the spring is connected with the piston portion, and the other end of the spring is connected with the inner wall of an outer end of the replenishment cylinder; the fire arresting cavity comprises one zone in a direction from the one of the fire arresting section openings to the other of the fire arresting section openings, and a fire arresting particle replenishment structure is arranged corresponding to the zone.

Embodiment 2

A flame arrester capable of automatically eliminating defects of a fire arresting portion, comprising a first housing, a second housing, and a fire arresting section between the first housing and the second housing, wherein the fire arresting section is provided with a fire arresting section housing, and the fire arresting section housing is hollow and has two fire arresting section openings that are oriented to the first housing and the second housing respectively: the fire arresting section further comprises two blocking portions that are respectively arranged at the two fire arresting section openings so as to define a fire arresting cavity between the two blocking portions: a plurality of openings are formed in each of the blocking portions, and the fire arresting cavity is filled with fire arresting particles: the fire arresting section further comprises a fire arresting particle replenishment structure, which comprises a replenishment port, a replenishment cylinder, a replenishment cavity, a piston portion and a spring, wherein the replenishment port is formed in the fire arresting section housing, the replenishment cylinder extends outward from a rim of the replenishment port, the replenishment cavity is formed inside the replenishment cylinder and is communicated with the fire arresting cavity, the piston portion and the spring are located in the replenishment cavity, and clearance between a rim of the piston portion and an inner wall of the replenishment cylinder is not greater than the particle size of the fire arresting particles: one end of the spring is connected with the piston portion, and the other end of the spring is connected with the inner wall of an outer end of the replenishment cylinder; the fire arresting cavity comprises three zones in a direction from one of the fire arresting section openings to the other of the fire arresting section openings, and each zone is provided with a fire arresting particle replenishment structure: in the direction from either fire arresting section opening to the center, the particle size of the fire arresting particles filled in an outer zone is greater than that of the fire arresting particles filled in an inner zone: the fire arresting particles filled in the zones at the two sides are alumina ceramic particles having a particle size of 5 mm, and the fire arresting particles filled in the zone in the middle are stainless steel balls having a particle size of 2 mm.

Embodiment 3

Figure 4:
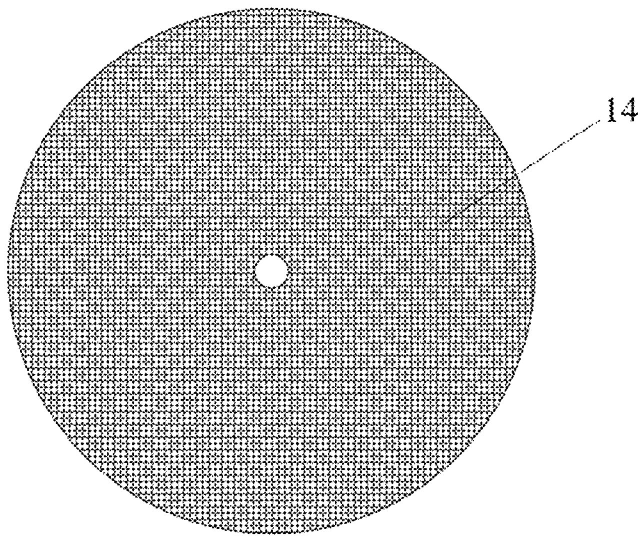
FIG. 4 is a schematic structural diagram of a wire mesh screen that can be used in the fire arresting section in FIG. 3.
Figure 5A:
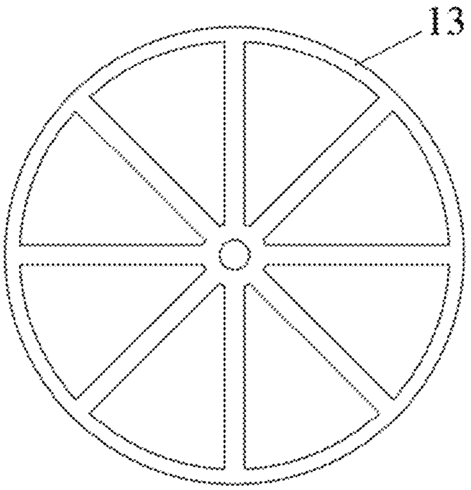
FIGS. 5A to 5D are schematic structural diagrams of a baffle that can be used in the fire arresting section in FIG. 3.
Figure 5B:
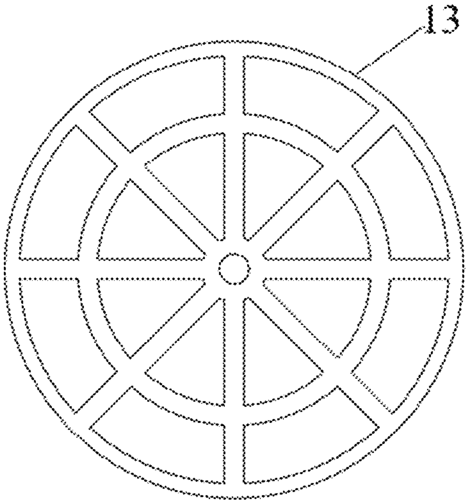
Figure 5C:
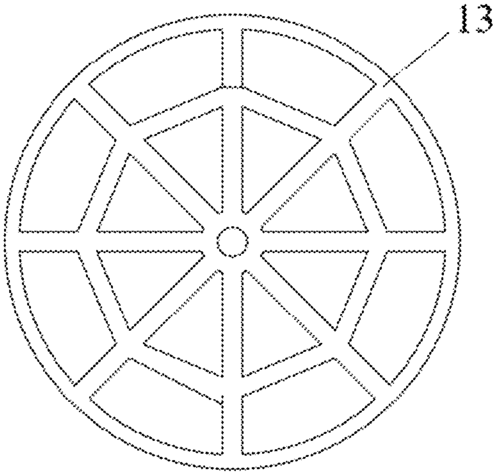
Figure 5D:
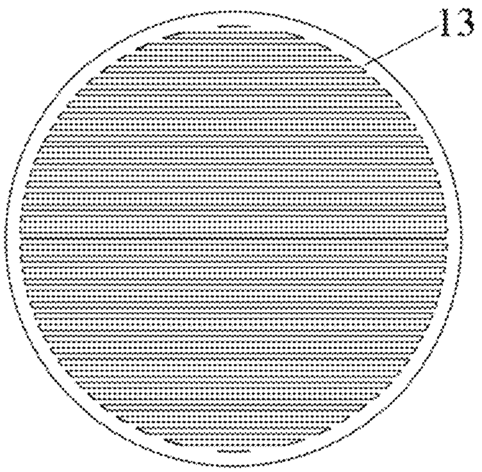

A flame arrester capable of automatically eliminating defects of a fire arresting portion, comprising a first housing, a second housing, and a fire arresting section between the first housing and the second housing, wherein the fire arresting section is provided with a fire arresting section housing, and the fire arresting section housing is hollow and has two fire arresting section openings that are oriented to the first housing and the second housing respectively: the fire arresting section further comprises two blocking portions that are respectively arranged at the two fire arresting section openings so as to define a fire arresting cavity between the two blocking portions: a plurality of openings are formed in each of the blocking portions, and the fire arresting cavity is filled with fire arresting particles: the fire arresting section further comprises a fire arresting particle replenishment structure, which comprises a replenishment port, a replenishment cylinder, a replenishment cavity, a piston portion and a spring, wherein the replenishment port is formed in the fire arresting section housing, the replenishment cylinder extends outward from a rim of the replenishment port, the replenishment cavity is formed inside the replenishment cylinder and is communicated with the fire arresting cavity, the piston portion and the spring are located in the replenishment cavity, and clearance between a rim of the piston portion and an inner wall of the replenishment cylinder is not greater than the particle size of the fire arresting particles: one end of the spring is connected with the piston portion, and the other end of the spring is connected with the inner wall of an outer end of the replenishment cylinder; the fire arresting cavity comprises three zones in a direction from one of the fire arresting section openings to the other of the fire arresting section openings, and each zone is provided with a fire arresting particle replenishment structure: in the direction from either fire arresting section opening to the center, the particle size of the fire arresting particles filled in an outer zone is greater than that of the fire arresting particles filled in an inner zone: the fire arresting particles filled in the zones at the two sides are of natural zeolite having a particle size of 4 mm, and the fire arresting particles filled in the zone in the middle are of a molecular sieve material having a particle size of 2.2 mm; moreover, the first housing and the second housing are respectively provided with inner openings on sides facing each other, and the first housing and the second housing are respectively provided with inner connecting flanges extending outward from edges of the inner openings: first connecting through-holes are respectively formed in the inner connecting flange of the first housing and the inner connecting flange of the second housing in a manner that the first connecting through-holes correspond to each other, the connecting portion comprises a first connecting rod and a first nut, wherein the first connecting rod is formed with a first threaded section at one end and is formed with another first threaded section or a first cap nut at the other end, the first nut can be fitted on the first threaded section, the first connecting rod is inserted through the first connecting through-holes in the first housing and the second housing, and both the first nut and the first cap nut have a maximum outer diameter greater than a maximum inner diameter of the first connecting through-hole at the corresponding side: at the two ends of the fire arresting section, the rim of the blocking portion abuts against the inner connecting flange at the corresponding side, and the blocking portion comprises a rigid baffle and a wire mesh screen disposed at an inner side of the baffle, wherein the baffle is any one of the baffles shown in FIGS. 5A to 5C, and the wire mesh screen is the wire mesh screen shown in FIG. 4.

While some preferred embodiments of the present disclosure are described above in detail with reference to the accompanying drawings, the present disclosure is not limited to those embodiments. Various simple variations may be made to the technical scheme of the present disclosure within the technical concept of the present disclosure. The specific technical features included in the present disclosure may be combined in any appropriate way. To avoid unnecessary repetition, various possible combinations are not described specifically in the present disclosure. However, such simple variations and combinations shall also be deemed as having been disclosed and falling in the scope of protection of the present disclosure.

The invention claimed is:

1. A flame arrester capable of automatically eliminating defects of a fire arresting portion, comprising a fire arresting section, wherein the fire arresting section is provided with a fire arresting section housing, the fire arresting section housing is hollow and fire arresting section openings are respectively formed at two ends of the fire arresting section housing, blocking portions are respectively arranged at the fire arresting section openings so as to define a fire arresting cavity between the two blocking portions, a plurality of openings are formed in the blocking portion, the fire arresting cavity is filled with fire arresting particles; wherein the fire arresting section further comprises a fire arresting particle replenishment structure, and the fire arresting particle replenishment structure is configured to automatically fill the fire arresting cavity with the fire arresting particles when a gap is generated in the fire arresting cavity.

2. The flame arrester capable of automatically eliminating defects of a fire arresting portion according to claim 1, comprising a replenishment port formed in the fire arresting section housing, a replenishment cylinder extending outward from a rim of the replenishment port, a replenishment cavity formed in the replenishment cylinder and communicated with the fire arresting cavity, and a piston portion and a spring arranged in the replenishment cavity, wherein the spring elastically abuts against the piston portion in a direction toward the fire arresting cavity, and clearance is formed between a rim of the piston portion and an inner wall of the replenishment cylinder to enable the piston portion to move in the replenishment cavity toward the fire arresting cavity.

3. The flame arrester capable of automatically eliminating defects of a fire arresting portion according to claim 2, wherein the replenishment cavity extends linearly and has a constant cross section in an extension direction, the clearance between the rim of the piston portion and the inner wall of the replenishment cylinder is not greater than a particle size of the fire arresting particles, one end of the spring is connected with the piston portion, and the other end of the spring is connected with an inner wall of an outer end of the replenishment cylinder.

4. The flame arrester capable of automatically eliminating defects of a fire arresting portion according to claim 3, wherein the piston portion is formed in a plate shape, and an extension direction of the piston portion is perpendicular to the extension direction of the replenishment cavity.

5. The flame arrester capable of automatically eliminating defects of a fire arresting portion according to claim 2, wherein the spring is always in a compressed state when the piston portion moves in the replenishment cavity in the extension direction of the replenishment cavity.

6. The flame arrester capable of automatically eliminating defects of a fire arresting portion according to claim 2, wherein the outer end of the replenishment cylinder is provided with an outer end opening and an outer end plate that detachably closes the outer end opening, a rim of the outer end opening extends outward to form an outer end plate connecting flange, and the outer end plate is connected to the outer end plate connecting flange by means of connecting elements.

7. The flame arrester capable of automatically eliminating defects of a fire arresting portion according to claim 1, wherein the fire arresting cavity comprises at least two zones in a direction from one of the fire arresting section openings to the other of the fire arresting section openings, and the particle size of the fire arresting particles filled in a first zone is greater than that of the fire arresting particles filled in a second zone; and the flame arrester comprises at least one fire arresting particle replenishment structure in each of the zones.

8. The flame arrester capable of automatically eliminating defects of a fire arresting portion according to claim 7, wherein, the fire arresting cavity comprises at least three zones in the direction from one of the fire arresting section openings to the other of the fire arresting section openings; and the particle size of the fire arresting particles filled in an outer zone is greater than that of the fire arresting particles filled in an inner zone in a direction from the fire arresting section opening to the center.

9. The flame arrester capable of automatically eliminating defects of a fire arresting portion according to claim 7, wherein the fire arresting section is in a shape of a straight cylinder with two open ends, interfaces between the zones are perpendicular to the extension direction of the fire arresting section, and a separating wire mesh screen extending along the interface is arranged at each interface; the extension direction of the replenishment cavity is perpendicular to the extension direction of the fire arresting section, or the fire arresting section housing is provided with an expansion section at each end and a cylindrical section between the two expansion sections, and each expansion section is formed into a truncated conical cylinder with cross-sectional area gradually increased in a direction toward the blocking section.

10. The flame arrester capable of automatically eliminating defects of a fire arresting portion according to claim 1, wherein the fire arresting particles are one or a combination of the following substances: metal, metal-organic framework material, molecular sieve material, natural zeolite, and ceramic material.

11. The flame arrester capable of automatically eliminating defects of a fire arresting portion according to claim 1, wherein the two ends of the fire arresting section housing are respectively connected with a first housing and a second housing, and the first housing and the second housing are respectively provided with inner openings on sides facing each other, and are respectively provided with inner connecting flanges extending outward from rims of the inner openings; the flame arrestor further comprises a connecting portion, and two ends of the connecting portion are respectively connected to the inner connecting flange of the first housing and the inner connecting flange of the second housing, so that the fire arresting section is sandwiched between the first housing and the second housing.

12. The flame arrester capable of automatically eliminating defects of a fire arresting portion according to claim 11, wherein first connecting through-holes are respectively formed in the inner connecting flange of the first housing and the inner connecting flange of the second housing in a manner that the first connecting through-holes correspond to each other, the connecting portion comprises a first connecting rod and a first nut, wherein the first connecting rod is formed with a first threaded section at one end and is formed with another first threaded section or a first cap nut at the other end, the first nut can be fitted on the first threaded section, the first connecting rod is inserted through the first connecting through-holes in the first housing and the second housing, and both the first nut and the first cap nut have a maximum outer diameter greater than a maximum inner diameter of the first connecting through-hole at the corresponding side; and a plurality of connecting portions are arranged in a circumferential direction of the inner connecting flanges of the first housing and the second housing.

13. The flame arrester capable of automatically eliminating defects of a fire arresting portion according to claim 11, wherein the first housing and the second housing are respectively provided with an expansion section at the side of the inner opening, and the expansion section is formed to have cross-sectional area gradually increased in a direction toward the inner opening.

14. The flame arrester capable of automatically eliminating defects of a fire arresting portion according to claim 13, wherein the expansion section is formed into a truncated conical cylinder with two open ends, the first housing and the second housing further respectively comprise a cylindrical section connected to the expansion section, and the cylindrical section extends from an edge of the expansion section on a side away from the inner opening in a direction away from the inner opening along a rotation axis of the truncated conical cylinder.

15. The flame arrester capable of automatically eliminating defects of a fire arresting portion according to claim 1, wherein grooves are formed in side walls of the two ends of the fire arresting section in a circumferential direction of the fire arresting section opening, and the blocking portions are mounted in the grooves.

16. The flame arrester capable of automatically eliminating defects of a fire arresting portion according to claim 15, wherein second connecting through-holes are respectively formed in the blocking portions at the two ends of the fire arresting section in a manner that the second connecting through-holes correspond to each other, the fire arresting section further comprises a second connecting rod and a second nut, wherein the second connecting rod is formed with a second threaded section at one end and is formed with another second threaded section or a second cap nut at the other end, and the second nut can be fitted on the second threaded section; the second connecting rod is inserted through the second connecting through-holes in the blocking portions at the two ends of the fire arresting section, and both the second nut and the second cap nut have a maximum outer diameter greater than a maximum inner diameter of the second connecting through-hole at the corresponding side.

17. The flame arrester capable of automatically eliminating defects of a fire arresting portion according to claim 1, wherein the blocking portion comprises a rigid baffle and a wire mesh screen disposed at an inner side of the baffle.

18. The flame arrester capable of automatically eliminating defects of a fire arresting portion according to claim 1, wherein the fire arresting section further comprises a fire arresting particle replacement structure, which comprises a fire arresting particle discharge port and a fire arresting particle replenishment port, wherein the fire arresting particle discharge port is formed at the bottom of the fire arresting section housing, the fire arresting particle replenishment port is formed at the top of the fire arresting section housing; the fire arresting section further comprises a discharge valve for controlling the opening and closing of the fire arresting particle discharge port and a replenishment valve for controlling the opening and closing of the fire arresting particle replenishment port.

19. The flame arrester capable of automatically eliminating defects of a fire arresting portion according to claim 18, wherein the fire arresting particle replacement structure comprises:

a discharge channel extending from the fire arresting particle discharge port, on which the discharge valve is mounted;

a replenishment channel extending from the fire arresting particle replenishment port, on which the replenishment valve is mounted;

a fire arresting section connector arranged at an outer end of the discharge channel and/or an outer end of the replenishment channel; and a material barrel, on which a material barrel connector that can be fitted with the fire arresting section connector is arranged.

20. The flame arrester capable of automatically eliminating defects of a fire arresting portion according to claim 18, further comprising a pressure difference detection portion for detecting a pressure difference between a pressure of a gas entering the fire arresting section and a pressure of a gas discharged from the fire arresting section, wherein the pressure difference detection portion comprises a first pressure detector and a second pressure detector, the first pressure detector is mounted on the first housing and a detection probe of the first pressure detector extends into a cavity in the first housing, and the second pressure detector is mounted on the second housing and a detection probe of the second pressure detector extends into a cavity in the second housing.

* * * * *